US010953683B2

(12) United States Patent
Sugdon et al.

(10) Patent No.: US 10,953,683 B2
(45) Date of Patent: Mar. 23, 2021

(54) SECURITY SHEETS COMPRISING SECURITY ELEMENTS

(71) Applicants: DE LA RUE INTERNATIONAL LIMITED, Basingstoke (GB); MELZER MASCHINENBAU GMBH, Schwelm (DE)

(72) Inventors: Matthew Sugdon, Basingstoke (GB); Simon Quainton, Basingstoke (GB); Arndt Melzer, Schwelm (DE)

(73) Assignees: DE LA RUE INTERNATIONAL LIMITED, Basingstoke (GB); MELZER MASCHINENBAU GMBH, Schwelm (DE)

( * ) Notice: Subject to any disclaimer, the term of this patent is extended or adjusted under 35 U.S.C. 154(b) by 0 days.

(21) Appl. No.: 16/753,423

(22) PCT Filed: Sep. 24, 2018

(86) PCT No.: PCT/EP2018/075834
§ 371 (c)(1),
(2) Date: Apr. 3, 2020

(87) PCT Pub. No.: WO2019/068498
PCT Pub. Date: Apr. 11, 2019

(65) Prior Publication Data
US 2020/0247170 A1 Aug. 6, 2020

(30) Foreign Application Priority Data
Oct. 4, 2017 (GB) ..................................... 1716160

(51) Int. Cl.
*B42D 25/355* (2014.01)
*B42D 25/29* (2014.01)
(Continued)

(52) U.S. Cl.
CPC ........... *B42D 25/29* (2014.10); *B42D 25/355* (2014.10); *B32B 2425/00* (2013.01);
(Continued)

(58) Field of Classification Search
CPC .................................................... B42D 25/355
See application file for complete search history.

(56) References Cited

U.S. PATENT DOCUMENTS 2,588,067 A * 3/1952 Whitehead ........... B42D 25/355
283/108
4,319,532 A * 3/1982 Fogarty .............. A63H 33/3088
112/169

(Continued)

FOREIGN PATENT DOCUMENTS

EP 0059056 9/1982
EP 1008099 3/1998

(Continued)

OTHER PUBLICATIONS

EP2653305A2 English Translation (Year: 2013).*

(Continued)

*Primary Examiner* — Kyle R Grabowski
(74) *Attorney, Agent, or Firm* — Ohlandt, Greeley, Ruggiero & Perle, L.L.P.

(57) ABSTRACT

The present invention relates to a method of manufacturing a security sheet comprising a security element (11), a core structure (10) for forming the security sheet, a stack (29) including such a core structure (10), a security sheet comprising the core structure (10) or stack (29) and a security document comprising the security sheet. At least one perforation (20) is formed through, from a first core surface (13) to a second core surface (14) of, at least one core layer (12) comprising plastic. A security element (11) is fed through the at least one perforation (20) such that the security element
(Continued)

(11) extends through, from the first core surface (13) to the second core surface (14) of, the at least one core layer (12). At least one first region (17) of the security element (11) is located over part of the first core surface (13) and at least one second region (18) of the security element (11) is located over part of the second core surface (14).

11 Claims, 5 Drawing Sheets

(51) Int. Cl.
    *B42D 25/328*    (2014.01)
    *B42D 25/351*    (2014.01)
    *B42D 25/455*    (2014.01)

(52) U.S. Cl.
    CPC .......... *B42D 25/328* (2014.10); *B42D 25/351* (2014.10); *B42D 25/455* (2014.10)

(56) References Cited

U.S. PATENT DOCUMENTS

| | | | | |
|---|---|---|---|---|
| 5,424,119 A * | 6/1995 | Phillips | ................ | B42D 25/355 |
| | | | | 428/328 |
| 6,471,247 B1 * | 10/2002 | Hardwick | .............. | B42D 25/29 |
| | | | | 283/72 |
| 6,669,813 B1 | 12/2003 | Melzer | | |
| 2011/0042023 A1 * | 2/2011 | Baker | ................... | D21H 21/42 |
| | | | | 162/110 |
| 2011/0226408 A1 | 9/2011 | Melzer | | |
| 2013/0113201 A1 | 5/2013 | Endres | | |
| 2013/0207376 A1 * | 8/2013 | Sugdon | ................ | B42D 25/355 |
| | | | | 283/85 |
| 2014/0138444 A1 | 5/2014 | Riedl | | |
| 2016/0257019 A1 | 9/2016 | Baist | | |

FOREIGN PATENT DOCUMENTS

| | | | | |
|---|---|---|---|---|
| EP | 1258334 | 11/2002 | | |
| EP | 2611622 | 7/2013 | | |
| EP | 2653305 | 10/2013 | | |
| EP | 2653305 A2 * | 10/2013 | ........... | B42D 25/355 |
| GB | 2535985 | 9/2016 | | |
| WO | 98/12671 | 3/1998 | | |
| WO | 00/39391 | 7/2000 | | |
| WO | 2004/001130 | 12/2003 | | |
| WO | WO-2008031584 A1 * | 3/2008 | ....... | G06K 19/07749 |
| WO | 2015/104011 | 7/2015 | | |
| WO | WO-2015197617 A1 * | 12/2015 | ........... | B42D 25/355 |
| WO | WO-2016135444 A1 * | 9/2016 | ........... | B42D 25/351 |
| WO | 2017/060684 | 4/2017 | | |
| WO | 2017/060688 | 4/2017 | | |

OTHER PUBLICATIONS

International Search Report dated Jan. 4, 2019 in corresponding International Application PCT/EP2018/075834.
Written Opinion dated Jan. 4, 2019 in corresponding International Application PCT/EP2018/075834.
Great Britain Search and Examination Report dated Apr. 5, 2018 in corresponding application GB1716160.5.
Great Britain Examination Report dated Oct. 15, 2019 in corresponding application GB1716160.5.
Great Britain Examination Report dated Feb. 20, 2020 in corresponding application GB1716160.5.

* cited by examiner

SECURITY SHEETS COMPRISING SECURITY ELEMENTS

TECHNICAL FIELD

The present invention relates to methods of manufacturing a security sheet comprising a security element. The present invention further relates to a core structure for forming the security sheet, a stack including such a core structure, a security sheet comprising the core structure or stack and a security document comprising the security sheet.

BACKGROUND

Security documents and booklets, such as passports, passbooks, identification documents, certificates, licences, cheque books and the like, commonly comprise one or more security sheets for preventing successful counterfeiting. Security threads are particularly suitable security features for security sheets as they can carry yet further security features. Furthermore, security threads are securely embedded within the security sheet such that it is either difficult for a counterfeiter to remove them or any such removal is identifiable to a document inspector. If the security sheet comprises a fibrous substrate or paper, the security thread is commonly at least partially embedded in it during the paper making process, for example as disclosed in WO-00/39391, EP-A-0059056 and WO-A-2004/001130. The security thread may also be "windowed" by being covered and not visible in areas by "bridges" of fibrous substrate and exposed and visible at "windows". Windowed security threads improve resistance to counterfeiting because they are difficult to remove without tearing the fibrous substrate and are difficult for a counterfeiter to imitate.

If the security sheet comprises a plastic, such as polycarbonate, the security thread is typically introduced between two plastic layers and embedded therebetween by lamination. The security thread may, for example, be adhered to a plastic layer prior to lamination, as disclosed in EP-B-2611622, or comprise an outer plastic layer that fuses with the adjacent plastic layers during lamination, as disclosed in US-A-2013/0113201. Alternatively, the security thread may be coextruded such that it is integrally formed with one of the plastic layers, as disclosed in US-A-2014/0138444. However, the incorporation of the security threads is relatively simple in such arrangements, such that they are not particularly difficult for a counterfeiter to imitate.

In addition, the aforementioned methods do not enable the provision of a windowed security thread in a plastic security sheet as in a paper security sheet. WO-A-2017/060684 discloses a security thread located in a transparent region extending between the front surface of a plastic security sheet and an internal opaque layer with a transparent region or window. When viewing the rear surface of the security sheet, the security thread is blocked from view by the opaque layer, but visible through the window. However, again, such an arrangement is not particularly difficult to counterfeit. Furthermore, the need for an additional opaque layer on one side of the security thread to partially hide it severely restricts the design options available for aesthetic purposes and other security features.

SUMMARY

An object of the present invention is therefore to provide a method of securely incorporating a security element, and particularly a security thread, into a plastic security sheet with improved counterfeiting prevention. A further object is to provide a security sheet that is more difficult to imitate by a counterfeiter. A yet further object may also be to provide an improved method of providing a windowed security element in a plastic security sheet.

The present invention therefore provides a method of manufacturing a security sheet comprising: forming at least one perforation through, from a first core surface to a second core surface of, at least one core layer comprising plastic; feeding a security element through the at least one perforation such that the security element extends through, from the first core surface to the second core surface of, the at least one core layer; and locating at least one first region of the security element over part of the first core surface and locating at least one second region of the security element over part of the second core surface.

The method preferably comprises laminating together the at least one core layer and security element (i.e. the core structure) and, if present, at least one further plastic layer. Lamination forms a strong bond between the layers such that it is very difficult for a counterfeiter to separate the layers and remove or tamper with the security element. Such difficulty is increased if a layer of material of the security element is selected to fuse with, and thereby form a strong bond with, the at least one core layer and/or at least one further plastic layer.

The method preferably comprises forming at least one perforation as a tab and feeding the security element to extend through the or each at least one perforation twice by locating a first region over the first core surface of the tab and locating second regions over the second core surface adjacent the tab, or vice-versa. Such an arrangement enables the security element to be fed into the at least one core layer from one side of the at least one core layer. As a result, the process of inserting the security element into the at least one core layer may be performed using a continuous line of security element in a continuous manufacturing process, thereby significantly increasing the speed of manufacture.

The present invention further provides a core structure for forming a security sheet comprising: at least one core layer comprising a plastic and first and second core surfaces and at least one perforation; and a security element fed and extending through the at least one perforation of the at least one core layer from the first core surface to the second core surface and comprising at least one first region overlying part of the first core surface and at least one second region overlying part of the second core surface.

The present invention further provides a stack for forming a security sheet comprising the core structure disclosed herein and at least one further layer comprising plastic overlying the first and/or second core surface. Preferably the at least one further layer comprises at least one transparent region through which at least one first and/or second region of the security element is visible in reflected light incident upon the at least one transparent region. The at least one further layer preferably comprises a hinge portion extending from the core structure and, if present, other further layer(s).

The present invention yet further provides a security sheet comprising the core structure or stack disclosed herein, the core structure or stack being laminated together. Preferably the plastic substrate comprises first and second outer surfaces, at least one first region of the security element is not visible in reflected light incident upon the second outer surface and/or at least one second region of the security element is not visible in reflected light incident upon the first outer surface.

The present invention yet further provides a security sheet comprising: a plastic substrate extending between first and second outer surfaces; and a security element extending through the plastic substrate and comprising at least one first region at a first distance from the first outer surface and at least one second region at a second distance from the first outer surface, the first and second distances being different. The at least one first region and at least one second region of the security element are preferably connected by at least one third region of the security element. The at least one first and second regions are preferably substantially parallel to the first and second outer surfaces. The at least one third region is preferably substantially non-parallel to the first and second outer surfaces. The plastic substrate preferably comprises a plurality of plastic layers laminated together. At least one first and/or second region of the security element is preferably separated from the first and second outer surface such that the security element is embedded within the plastic substrate.

The present invention yet further provides a security document comprising the security sheet disclosed herein. The security document may be a passport, driving licence, certificate, passbook, identification document, licence or cheque book. The present invention yet further provides a plurality of security documents disclosed herein wherein personal data on the security sheet of each security document is different to personal data on the security sheet of other security documents.

Since the security element extends through the at least one core layer and/or is embedded within the plastic substrate at a variable distance along its length, it is substantially mechanically locked therein and is thus very difficult for a counterfeiter to remove. Any removal is likely to result in destroying the at least one core layer, the security element and/or the plastic substrate. Furthermore, the complexity of manufacturing the security sheet is increased, thereby further discouraging attempted imitation by a counterfeiter.

In preferred embodiments at least part of the at least one core layer is opaque adjacent to at least one first and/or second region of the security element. As a result, the at least one first region is not visible in reflected light incident upon the second core surface (or the second outer surface) and/or at least one second region is not visible in reflected light incident upon the first core surface (or the first outer surface). The opaque area of the at least one core layer partially blocks the security element from view in reflected light at the first and second core surface and the first and second outer surface, thereby resulting in a windowed effect. For instance, when the first core surface or first outer surface is viewed a plurality of first regions (i.e. corresponding to the windows of windowed threads in paper) may be visible with gaps (i.e. corresponding to the bridges of windowed threads in paper), formed of the at least one core layer, between them. The second region(s) between the first regions are blocked from view at the first core surface or first outer surface by the opaque area. As a result, the present invention provides an effective method of providing the windowing effect in a plastic security sheet. In addition, the complexity of imitation by counterfeiters is increased by the windowing effect and an improved aesthetic effect is achieved. Furthermore, the security element may be visible at the first or second core surface when the first or second core or outer surfaces are viewed in transmitted light (i.e. light passing through the core structure or security sheet to the eye).

Preferably the at least one perforation is preformed, cut, die cut and/or punched in the at least one core layer. Preferably the security element is fed to extend through the at least one perforation.

The security element is preferably an elongate security thread. However, the security element may alternatively comprise a security patch, foil, substantially opaque body or the like. Furthermore, the core structure may comprise a plurality of security elements, each extending through the at least one core layer from the first core surface to the second core surface and comprising at least one first region overlying part of the first core surface and at least one second region overlying part of the second core surface.

BRIEF DESCRIPTION OF THE DRAWINGS

By way of example only, embodiments of a core structure, stack, security sheet, security document and method of manufacture in accordance with the present invention are now described with reference to, and as shown in, the accompanying drawings, in which:

FIG. 10 is a plan view of a core structure comprising the core layer and security element of FIG. 1B;

DETAILED DESCRIPTION

The method of manufacture of a security sheet according to the present disclosure generally comprises forming a core structure having a security element therein. At least one further layer may be applied to one or both sides of the core structure in a stack. The security sheet is formed of a plastic substrate by laminating the core structure and/or at least one further layer. The security sheet may subsequently form and/or be incorporated into a security document.

FIGS. 1A to 1D illustrate an embodiment of a core structure 10 comprising at least one core layer 12 and a security element 11, in this example a security thread, embedded therein. The at least one core layer 12 comprises opposing first and second core surfaces 13, 14, which may be the surfaces 13, 14 of a single core layer 12 as illustrated or the outer surfaces of outer layers of a plurality of core layers 12. The at least one core layer 12 comprises plastic. The at least one core layer 12 comprises a thickness between the first and second core surfaces 13, 14 and extends across a first width 15 and, in a perpendicular direction, a second width 16.

At least one perforation 20 is formed in the at least one core layer 12 extending from the first core surface 13 to the second core surface 14 through the thickness of the at least one core layer 12. Adjacent perforations 20 are at locations separated by a gap along the first and second core surfaces 13, 14. The or each at least one perforation 20 preferably defines a tab 21 attached to the rest of the at least one core layer 12 at a connection 22, which may operate as a hinge or pivot point of the tab 21. The or each tab 21 extends from the connection 22 in a direction parallel to the second width 16.

The security element 11 extends through the at least one core layer 12, through each at least one perforation 20, from the first core surface 13 to the second core surface 14. The security element 11 thereby comprises at least one first region 17 overlying part of the first core surface 13 and at least one second region 18 overlying part of the second core surface 14. The security element 11 further comprises at least one third region 19 extending through the at least one core layer 12 and connecting first and second regions 17, 18.

The security element 11 preferably comprises a plurality of first, second and third regions 17, 18, 19 as in the illustrated embodiment. The security element 11 extends through the at least one core layer 12 at a plurality of locations, each at a perforation 20, and, between adjacent locations, comprises a first region 17 overlying part of the first core surface 13 or a second region 18 overlying part of the second core surface 14. Therefore, the security element 11 overlies the first and second core surfaces 13, 14 in an alternating arrangement on either side of each perforation 20. In particular, in the direction along the length of the security element 11, a first region 17 extends over the first core surface 13, a third region 19 extends through the thickness of the core layer 12, a second region 18 extends over the second core surface 14, a third region 19 extends through the thickness of the core layer 12 and so forth.

In the illustrated embodiment, in which the at least one perforation 20 comprises a tab 21, the or each perforation 20 defines two locations for the security element 11 to pass through the at least one core layer 12 and the security element 11 extends through the perforation 20 twice. The first region(s) 17 of the security element 11 overlies at least part of the first core surface 13 adjacent a tab 21 and/or between the tabs 21. The second region(s) 18 of the security element 11 overlies at least part of the second core surface 14 of the tab(s) 21. Alternatively, the first region(s) 17 overlies at least part of the first core surface 13 of the tab(s) 21 and the second region(s) 18 overlie at least part of the second core surface 14 adjacent a tab 21 and/or between the tabs 21.

Figure 2A:
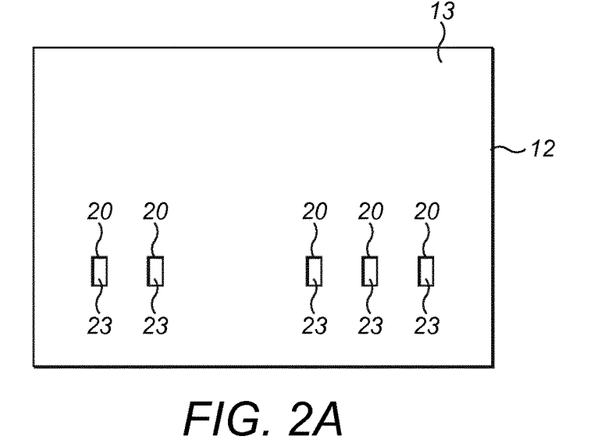
FIG. 2A is a plan view of a further embodiment of a core layer for forming a core structure in a method of manufacturing a security sheet according to the present invention.
Figure 2B:
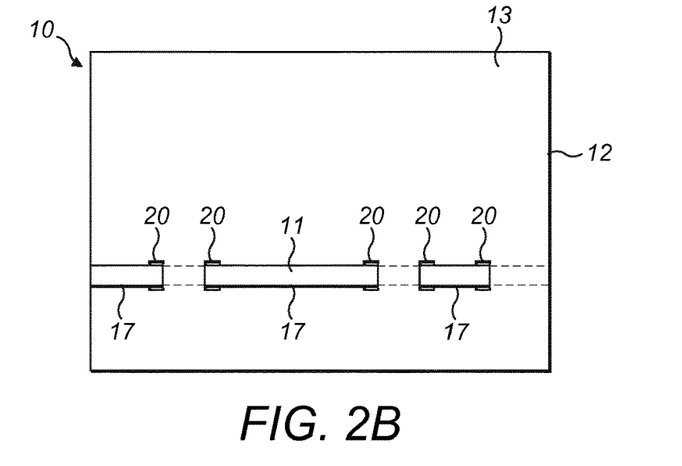
FIG. 2B is a plan view of a core structure comprising a security element located in the core layer of FIG. 2A.

FIGS. 2A and 2B illustrate a further embodiment of the core structure 10 and at least one core layer 12 in which the at least one perforation 20 comprises a slot 23. The security element 11 extends through each slot 23 such that it overlies the first core surface 13 on one side of the slot 23 and the second core surface 14 on the other side of the slot 23.

Figure 3:
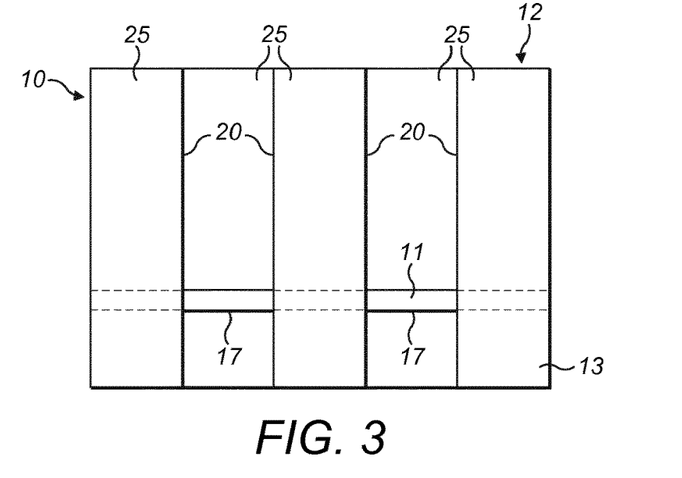
FIG. 3 is a plan view of a further embodiment of a core structure formed in a method of manufacturing a security sheet according to the present invention.

In yet a further embodiment, illustrated in FIG. 3, the at least one core layer 12 comprises a plurality of abutting or adjacent strips 25. The at least one perforation 20 is formed from abutting edges of the adjacent strips 25 and the security element 11 extends through the at least one core layer 12 between the abutting edges. As a result, the security element 11 extends over the first core surface 13 of one strip 25 and over the second core surface 14 of the adjacent strip 25 or vice-versa.

Figure 4A:
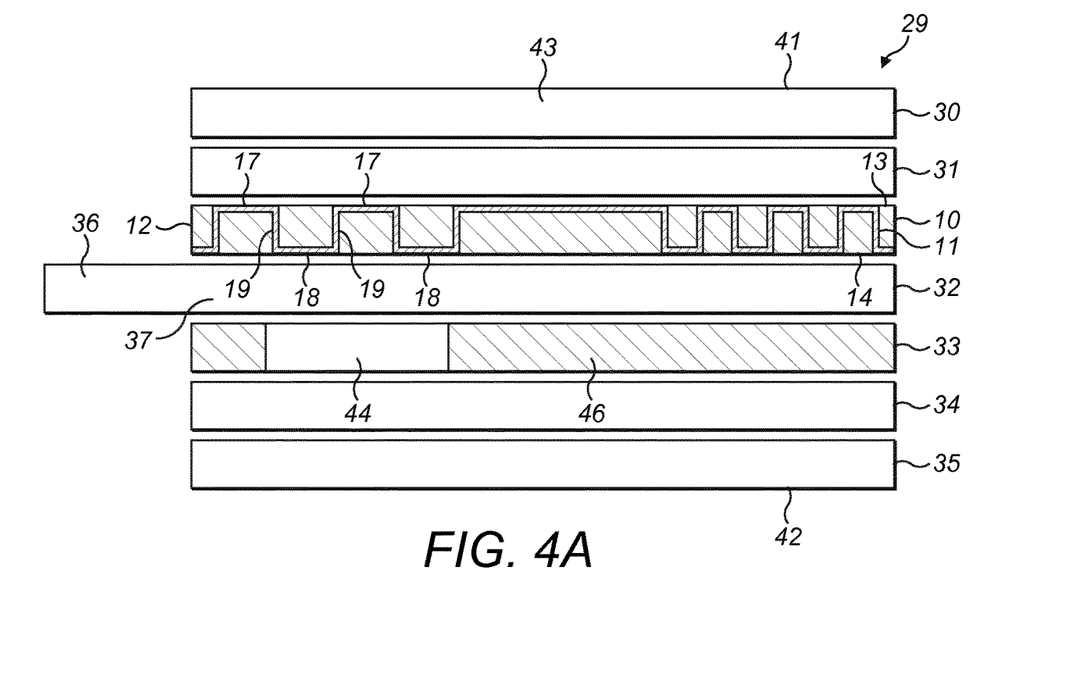
FIG. 4A is a cross-sectional side elevation of a stack of layers for forming a plastic substrate for a security sheet according to the method of the present invention.
Figure 4B:
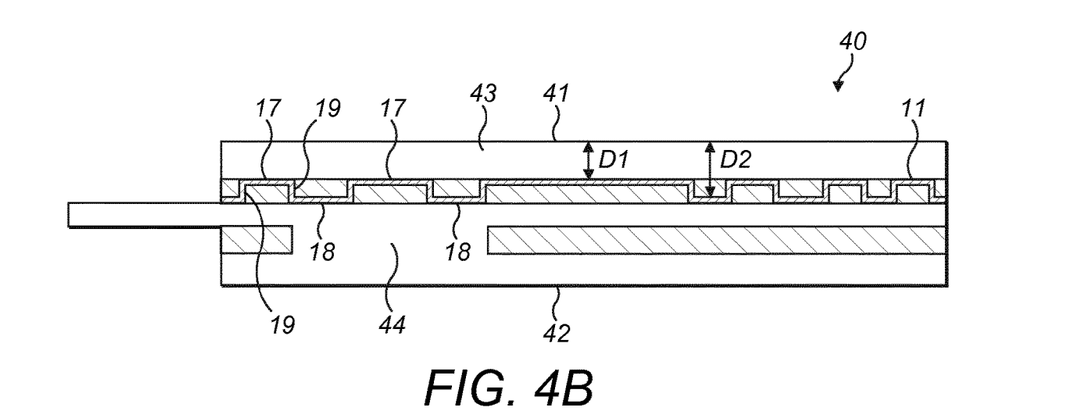
FIG. 4B is a cross-sectional side elevation of the plastic substrate formed by the stack of FIG. 4A through section B-B.
Figure 4C:
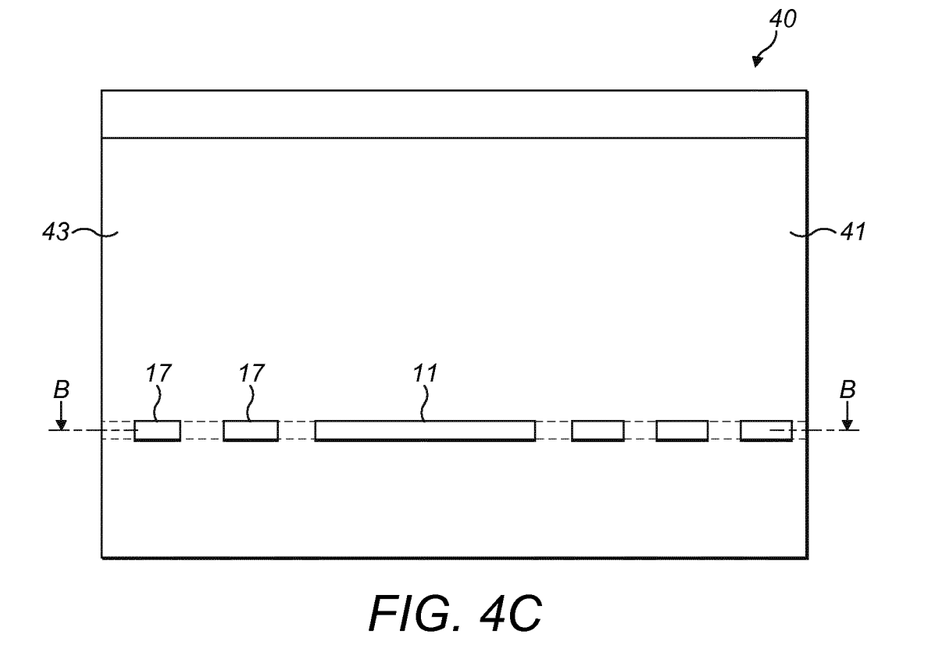
FIG. 4C is a plan view of a first outer surface of the plastic substrate of FIG. 4B.
Figure 4D:
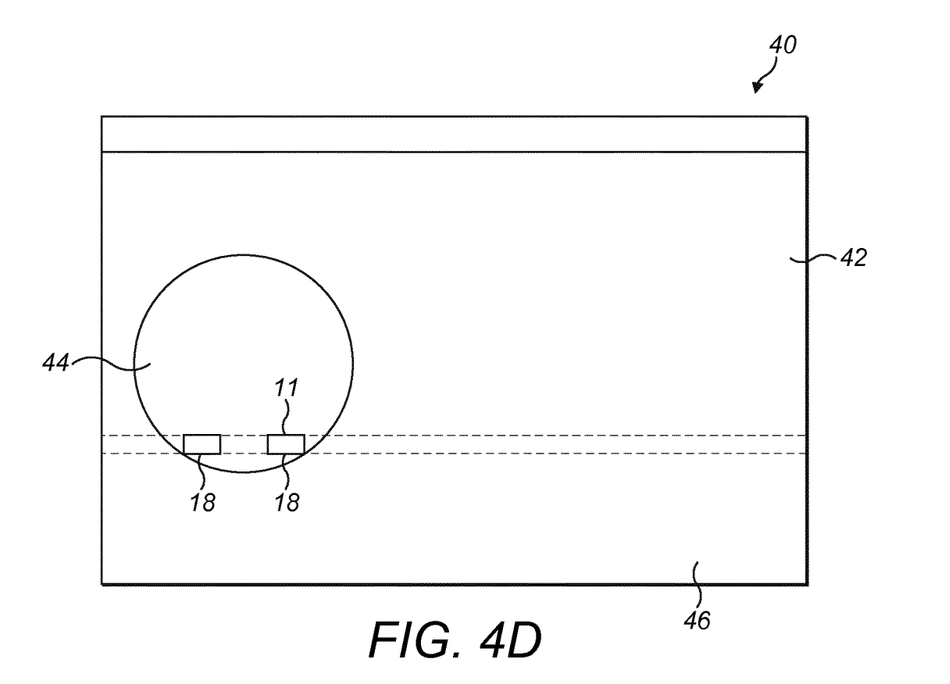
FIG. 4D is a plan view of a second outer surface of the plastic substrate Figure B.

A stack 29 is formed, as illustrated in FIG. 4A, by locating at least one further layer 30, 31, 32, 33, 34, 35 over one or both of the first and second core surfaces 13, 14 of the core structure 10. The at least one further layer 30, 31, 32, 33, 34, 35 preferably comprises a plastic. A plastic substrate 40 is formed, as illustrated in FIGS. 4B to 4D, by laminating the core structure 10 and at least one further layer 30, 31, 32, 33, 34, 35 together. In other embodiments the plastic substrate 40 may be formed by laminating the core structure 10 alone. The stack 29 and plastic substrate 40 comprise first and second outer surfaces 41, 42 formed by the outermost surfaces of the at least one further layer 30, 31, 32, 33, 34, 35 and/or core structure 10. The method of forming the stack 29 and lamination is discussed in further detail below.

At least one further layer 32 may be a hinge layer 32 comprising, as illustrated, a hinge portion 36 and an attachment portion 37. The attachment portion 37 is located within the stack 29 and at least partially overlies the rest of the further layers 30, 31, 33, 34, 35 and the core structure 10 to fix the hinge layer 32 in the plastic substrate 40 after lamination. The hinge portion 36 therefore extends from the main body of the stack 29 and plastic substrate 40 to enable the plastic substrate 40 to be attached in a security document. In the illustrated embodiment the hinge layer 32 is located adjacent to and overlies the second core surface 14, although it may be located at any suitable location in the stack 29.

The plastic substrate 40 and at least one further layer 30, 31, 32, 33, 34, 35 preferably comprise at least one substantially transparent region 43, 44 through which at least one first and/or second region 17, 18 of the security element 11 is visible in reflected light incident upon the at least one transparent region 43, 44. The at least one substantially transparent region 43, 44 thus preferably extends between at least one first and/or second region 17, 18 and the first and/or second outer surface 41, 42.

A first transparent region 43 may overlie the whole security element 11 such that all of the first regions 17 are visible in reflected light incident upon the first outer surface 41 or all of the second regions 18 are visible in reflected light incident upon the second outer surface 42. As in the illustrated embodiment, the first transparent region 43 may be formed by one or more first transparent further layers 30, 31 overlying the first core surface 13 and extending to, and thereby forming, the first outer surface 41.

A second transparent region 44 may overlie part of the security element 11 to form a window through which part of the security element 11 is visible in reflected light incident upon the second transparent region 44. In particular, at least part of at least one of the first or second regions 17, 18 of the security element 11 is visible in the second transparent region 44. The second transparent region 44 is preferably formed, as illustrated, by at least one window layer 33 comprising at least one opaque region 46 defining at least part of the perimeter of the second transparent region 44. The opaque region 46 partially blocks the core structure 10 from view when viewed in reflected light incident thereupon whilst the second transparent region 44 allows, in the illustrated embodiment, at least one second region 18 to be viewed. In the illustrated embodiment the second transparent region 44 also comprises a transparent attachment portion 37 of the hinge layer 32, which is located between the at least one window layer 33 and the core structure 10. The second transparent region 44 also comprises one or more second transparent further layers 34, 35 overlying the at least one window layer 33 and extending to, and thereby forming, the second outer surface 42. However, the hinge layer 32 and/or one or more second transparent further layer 34, 35 need not be present and the at least one window layer 33 may directly overlie the second core surface 14.

In a preferred embodiment at least part of the at least one core layer 12 is opaque adjacent to at least one first and/or second region 17, 18 of the security element 11 such that at least one first region 17 is not visible in reflected light incident upon the second core surface 14 and/or at least one second region 18 is not visible in reflected light incident upon the first core surface 13. The result is that, when viewed in reflected light, the at least one core layer 12 creates a windowing effect of the security element 11. In the embodiment of FIG. 4A to FIG. 4D the at least one core layer 12 is opaque across substantially all of the first and second width 15, 16 of the core structure 10, stack 29 and plastic substrate 40. If the core structure 10 comprises a plurality of core layers 12, only one or more core layers 12 may be at least partially opaque.

The arrangement of the at least one transparent region 43, 44 controls the first or second regions 17, 18 visible in reflected light from the first or second outer surfaces 41, 42 where the at least one core layer 12 is at least partially opaque. As in the illustrated embodiment, only the first regions 17 of the security element 11 are visible in the first transparent region 43 from the first outer surface 41 when viewed in reflected light incident thereupon. Only the, or parts of the, second regions 18 overlapping the second transparent region 44 are visible from the second outer surface 42 when viewed in reflected light incident thereupon. However, if the at least one core layer 12 is transparent, the first and second regions 17, 18 of the security element 11 are all visible from the first outer surface 41 through the first transparent region 43. All of the first and second regions 17, 18 overlapping the second transparent region 44 are visible from the second outer surface 42 through the second transparent region 44.

Furthermore, the security element 11 is preferably at least partially visible when the core structure 10, security sheet and/or plastic substrate 40 is viewed in transmitted light. The first or second regions 17, 18 of the security element 11 not visible at the first or second outer surface 41, 42 in reflected light may be visible in transmitted light at the first or second outer surface 41, 42. For example, the first regions 17 may not be visible in reflected light incident upon the second outer surface 42. However, the first regions 17 may be visible when the second outer surface 42 is viewed in light transmitted from the first outer surface 41, through the plastic substrate 40, through the second outer surface 42 and into the observer's eye. For instance, the security element 11 may be visible as a silhouette as shown in dashed lines in FIGS. 10, 2B, 3, 4C and 4D.

The plastic substrate 40 resulting from the lamination of the plurality of plastic layers 12, 30, 31, 32, 33, 34, 35 is substantially unitary with little or no definition between the at least one core layer 12 and at least one further layer 30, 31, 32, 33, 34, 35. In the plastic substrate 40 the security element 11 varies in distance from the first or second outer surfaces 41, 42. As illustrated in FIG. 4B, the at least one first region 17 is at a first distance D1 from the first outer surface 41 and the at least one second region 18 is at a second distance D2 from the first outer surface 41. The first and second distances D1, D2 are different and, in particular, the first distance is less than the second distance since the at least one first region 17 is closer to the first outer surface 41 than the at least one second region 18. It will be appreciated that any alternative reference point may be used instead of the first outer surface 41, such as the second outer surface 42.

Furthermore, in the illustrated plastic substrate 40 the first and second regions 17, 18 of the security element 11 are all separated from the first and second outer surfaces 41, 42 such that the security element 11 is substantially entirely embedded within the plastic substrate 40 (although the ends of the security element 11 may be at least partially exposed at the edges of the plastic substrate 40). In general, preferably at least one first and/or second region 17, 18 is separated from the first and/or second outer surface 41, 42 and thereby embedded in the plastic substrate 40 such that a counterfeiter cannot reach at least a portion of the security element 11 without destroying at least part of the plastic substrate 40. Such separation is achieved by the existence of at least one further layer 30, 31, 32, 33, 34, 35 overlying the core structure 10. However, in an alternative embodiment the plastic substrate 40 may not comprise a further layer 30, 31, 32, 33, 34, 35 on one of both first and second core surfaces 13, 14 of the core structure 10 such that the security element 11 is exposed at the first and/or second outer surface 41, 42. Thus, if there are no further layers 30, 31, 32, 33, 34, 35, the first distance D1 is zero whilst the second distance D2 is the thickness of the core structure 10.

In the plastic substrate 40 the at least one first and second regions 17, 18 of the security element 11 extend substantially parallel to the first and second outer surfaces 41, 42 and the at least one third region 19 is substantially non-parallel to the first and second outer surfaces 41, 42. In particular, in the at least one third region 19 the security element 11 extends substantially orthogonal to the first and second outer surfaces 41, 42 due to its extension through the perforation(s) 20.

The plastic from which the plastic substrate 40, at least one core layer 12 and, if present, further layer 30, 31, 32, 33, 34, 35 are formed may be a thermoplastic polymer such as polycarbonate, polyester, polyethylene, polypropylene or polyvinyl chloride. Polycarbonate is particularly suitable due to its high durability, its ease of manufacture and the ease with which security features can be incorporated within it. The plastic substrate 40 is preferably substantially rigid or at least semi-rigid, this preferably being a result of the thickness of its constituent layers 12, 30, 31, 32, 33, 34, 35. Each of the at least one core layer 12 and at least one further layer 30, 31, 32, 33, 34, 35 may be between approximately 0.05 mm thick and approximately 3 mm thick. The thickness of the plastic substrate 40, which is the distance between the first and second outer surfaces 41, 42, is preferably at least approximately 150 µm and more preferably at least approximately 300 µm. In particular, the plastic substrate 40 may be between approximately 300 µm and 1000 µm thick and, for example, may be approximately 300 µm thick or approximately 800 µm thick.

The method of formation of the core structure 10 and/or stack 29 and subsequent lamination thereof is preferably based upon a substantially continuous and in-line method, similar to that of WO-A-2017/060684, WO-A-2017/060688, WO-A-2015/104011, U.S. Pat. No. 6,669,813 and US-2011/0226408. The core structure 10 may be formed separately by firstly forming the at least one core layer 12 and subsequently inserting the security element 11 therein. If the core structure 10 comprises a plurality of core layers 12, they may be laminated together prior to or after insertion of the security element 11 into them. The at least one perforation 20 is preferably formed by cutting, die cutting or punching the at least one core layer 12.

Figure 1A:
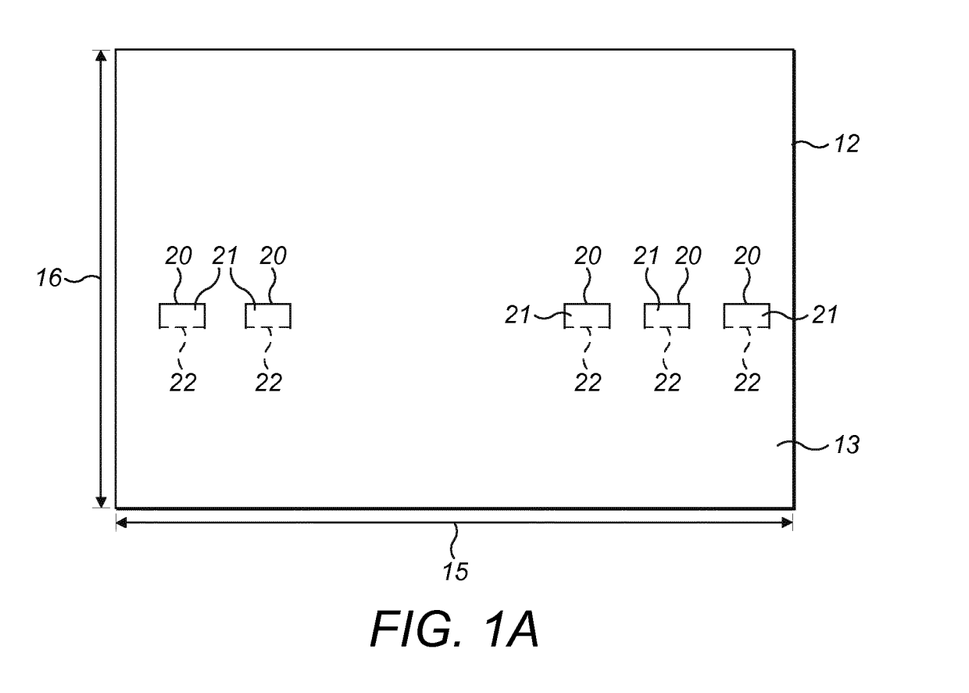
FIG. 1A is a plan view of a core layer for forming a core structure in a method of manufacturing a security sheet according to the present invention.
Figure 1B:
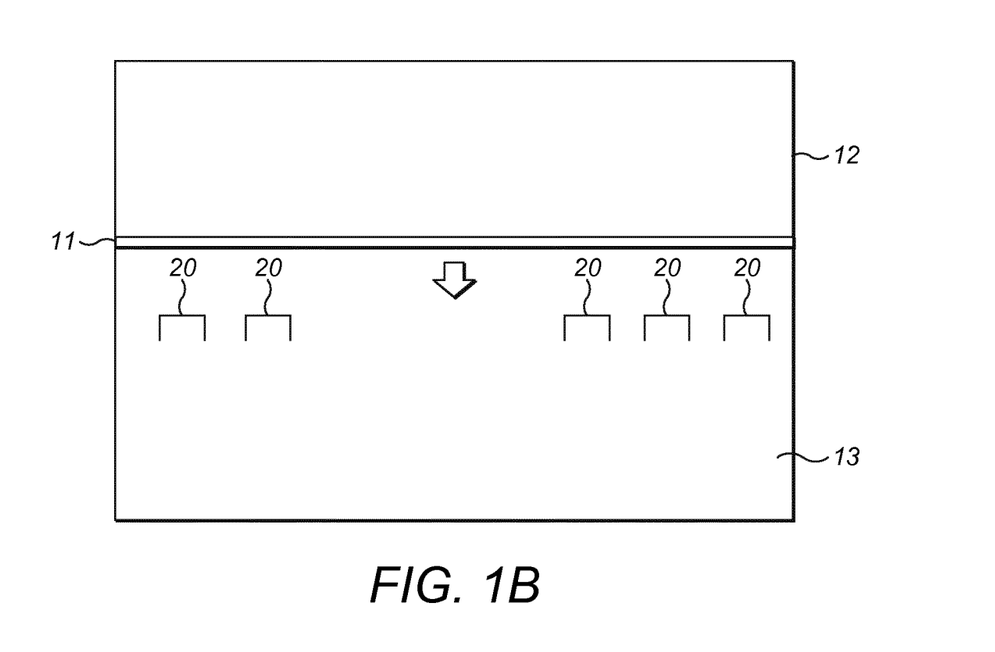
FIG. 1B is a plan view of the core layer of FIG. 1A showing a security element being inserted into the core layer.
Figure 1C:
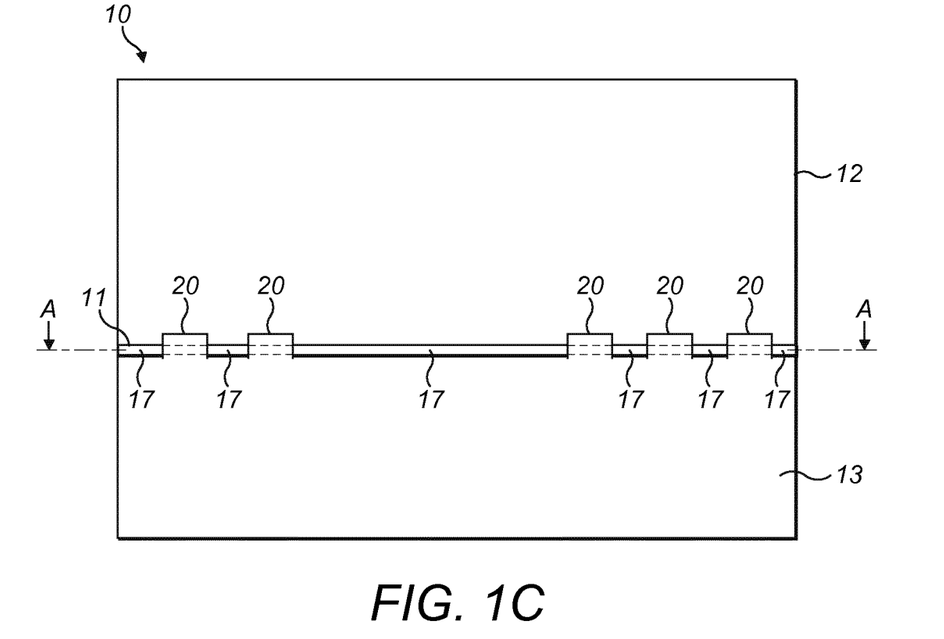
Figure 1D:
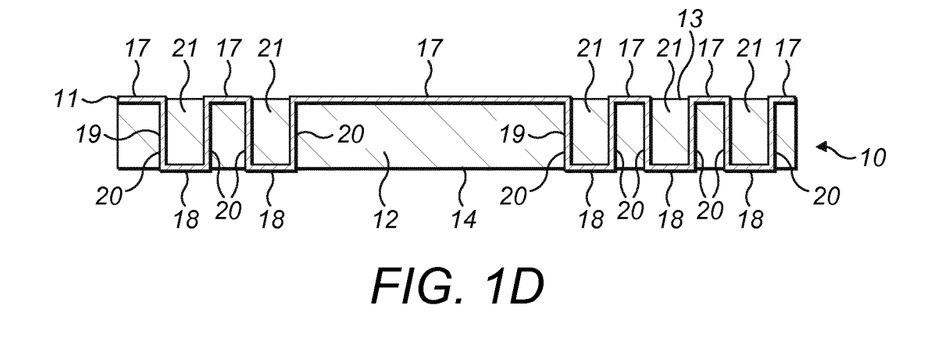
FIG. 1D is a cross-sectional side elevation of the core structure of FIG. 10 through section A-A.

The security element 11 is inserted, threaded or fed through the at least one perforation 20, preferably, as illustrated in FIGS. 1B and 1O, after it is arranged extend parallel to the first width 15 at the first core surface 13. Preferably the security element 11 is brought under each tab 21 (i.e. brought under the second core surface 14 of each tab 21) by raising or pivoting the tab 21 above the first core surface 13 about the connection 22.

In the embodiment of FIGS. 2A and 2B, the security element 11 is fed or threaded through each slot 23 sequentially. Whilst such an arrangement may, compared to the embodiment of FIGS. 1A to 1D, require more complex tools to feed the security element 11 through each slot 23 sequentially, the slots 23 avoid the need for tools to pivot each tab 21 to fit the security element 11 thereunder. In the embodiment of FIG. 3, the strips 25 may be brought adjacent to one another before or after the feeding of the security element 11 therethrough.

The at least one further layers 30, 31, 32, 33, 34, 35 are also formed separately to the core structure 10 prior to being overlaid upon one another. For instance, the hinge layer 32 may be formed with the hinge portion 36 embedded in the attachment portion 37. The second transparent region 44 and at least one opaque region 46 may also be formed as described in WO-A-2017/060684 and WO-A-2017/060688. In particular, the second transparent region 44 is formed from a transparent insert located in a correspondingly shaped aperture in an opaque plastic layer. Preferably the aperture and insert are formed and brought together by a single punch tool in line.

The stack 29 may be formed by laying one or more of the layers 12, 30, 31, 32, 33, 34, 35 over one another sequentially. A plurality of the at least one further layers 30, 31, 32, 33, 34, 35 may be laid over one another first, the core structure 10 located thereover and the remainder of the further layers 30, 31, 32, 33, 34, 35 laid over the core structure 10. However, the layers 12, 30, 31, 32, 33, 34, 35 may be mounted on feeding rolls or the like and the stack 29 may be brought together at substantially the same time as, or just prior to, lamination. Such an arrangement is disclosed in WO-A-2017/060684 and WO-A-2017/060688.

During lamination a laminator fuses the layers 12, 30, 31, 32, 33, 34, 35 together by the application of heat and pressure to form the plastic substrate 40. Preferably the laminator comprises continuous belts for drawings the layers 12, 30, 31, 32, 33, 34, 35 between sequential heating and cooling devices. During the heating process each of the layers 12, 30, 31, 32, 33, 34, 35 become at least softened or semi-molten (i.e. a liquid of relatively high viscosity) so that the plastic flows and mixes together across the interfaces between them, thereby forming the substantially unitary plastic substrate 40. In order to achieve such fusing the heating devices raise the temperature and pressure applied to the layers 12, 30, 31, 32, 33, 34, 35 to reach the softening point of the plastic. Suitable methods are disclosed in WO-A-2017/060684 and WO-A-2017/060688.

After the plastic substrate 40 has exited the laminator it is cut into a plurality of security sheets. Each security sheet itself may form a security document (e.g. a licence), or it may form part of a security document (e.g. in a passport). The security document may be of any suitable type having the security sheet, including banknotes, cards, such as identity cards, driving licences and the like, and booklets, such as passports, passbooks, identification documents, certificates, licences, cheque books and the like. In the case of booklets, the security sheet may be attached therein by stitching the hinge portion 36 to a cover or one or more paper or polymer leaves.

Personal data relating to the holder of the security document is preferably applied to the security sheet or plastic substrate 40, preferably by laser marking. The personal data is typically applied after formation of the security sheet, but it may be applied prior to formation, such as by being printed or marked on one of the layers 12, 30, 31, 32, 33, 34, 35 prior to lamination. Such personal data is known as "variable data" or "biographical data" and, typically, no two security sheets or security documents issued by an issuing authority contain the same personal data. The Seventh Edition (2015) of Document 9303 ("Machine Readable Travel Documents") issued by the International Civil Aviation Organization (ICAO) describes such biographical data. The personal data typically includes an image of the holder, text providing the holder's name, nationality and date of birth and a machine readable zone containing machine readable data.

Various alternatives to those described above also fall within the scope of the present invention. In the illustrated embodiments the locations at which the security element 11 extends through the at least one core layer 12 are irregularly spaced. However, in other embodiments the locations may be evenly spaced such that at least one first region 17 is substantially the same size as at least one second region 18.

As in the illustrated embodiments, the security element 11 may be a substantially continuous security thread having any of the forms well known in the art and may comprise an elongate strip, band or ribbon of impermeable material. The security thread may extend between opposing edges of the security sheet and plastic substrate 40. The security thread is preferably between 11 µm and 25 µm thick and is preferably between approximately 2 mm and approximately 20 mm wide.

The security element 11 may alternatively comprise a discrete band, patch, foil, opaque body or impermeable member. In particular, rather than forming a continuous security thread, the security element 11 may comprise a discrete strip or thread having one or more ends inside the edges of the plastic substrate 40. The security element 11 may be a patch passing through a relatively large perforation 20 such that a second region 18 overlies the second core surface 14 whilst the first region 17 overlies the first core surface 13.

Suitable materials for forming the security element 11 include polycarbonate, polyethylene terephthalate (PET), oriented polypropylene (OPP), polyethylene (PE) or polyketone (PK). The security element 11 preferably comprises at least one layer of material selected for fusing with the at least one core layer 12 and/or further plastic layer 30, 31, 32, 33, 34, 35 during lamination to form a strong bond therebetween. In particular, the at least one layer of material may be the same as the material of the at least one core layer 12 and/or further plastic layer 30, 31, 32, 33, 34, 35, such as polycarbonate. The security element 11 may further comprise covert or overt security devices disposed in at least one first, second and/or third region 17, 18, 19 or continuously along its length. Different security devices may be located in different at least one first, second and/or third region 17, 18, 19 such that different security devices are visible at different "windows" on the same or opposing outer surfaces 41, 42. The security devices may be continuous patterns extending along the security element 11 in at least one first, second and third regions 17, 18, 19. Suitable overt features include those commonly used on windowing security threads in paper banknotes such as demetallised patterns, microtext, fine line patterns, latent images, venetian blind devices, lenticular devices, moiré interference devices and moiré magnification, holograms and other diffractive based devices, colour-shifting inks and/or luminescent or fluorescent inks. The covert features cannot be seen in visible light by the naked eye, but can be machine read and/or viewed by the naked eye in other forms of light. For example, the security element 11 may comprise at least one first, second and/or third region 17, 18, 19 having properties selected from at least one of magnetic (which may be coded), luminescent including fluorescent and phosphorescent, conductivity or the like. Such overt or covert features may be provided as logos, symbols, indicia or other recognisable shapes.

In a particular embodiment the security element 11 comprises at least one transparent layer and at least one opaque layer overlying the transparent layer. At least one transparent region, forming a logo, symbol, indicium, alphanumeric character or the like, may be formed in the at least one opaque layer. The at least one transparent region is therefore visible in transmitted light as a light area surrounded by the silhouette of the rest of the at least one opaque layer. In a particular embodiment the at least one opaque layer comprises a metal layer and the at least one transparent region is a demetallised region.

The core structure 10, plastic substrate 40 and/or security sheet may comprise a plurality of security elements 11, at least one of which is embedded as disclosed herein. The security element 11 may also extend at an acute angle to the first width 15 rather than being parallel thereto as disclosed herein, particularly if it is not a security thread. For example, a security patch may be located in any suitable orientation.

The plastic substrate 40 and one or more layers 12, 30, 31, 32, 33, 34, 35 may comprise at least one further security device embedded therein or located thereon. Graphical information, colours and/or patterns may be printed on the outer surfaces of the layers 12, 30, 31, 32, 33, 34, 35 prior to or after lamination. Electronic chips and antenna or the like may also be located within the plastic substrate 40, preferably being located in the hinge layer 32. The at least one security device may, for example, comprise laser markings, printed ink, holograms, UV responsive features, optically variable features, windowed or transparent features, laser-perforations and the like. The at least one security device may be visible when viewed in reflected light by virtue of being located in the at least one transparent region 43, 44. Alternatively the at least one security device may be covert, such as by being located in at least one opaque core layer 12 and/or the opaque region 46 of the window layer 33, such that it is not visible when viewed in reflected light.

The core structure 10 is preferably subsequently laminated in order to embed the security element 11 in the at least one core layer 12. The materials of the security element 11 and at least one core layer 12 may be selected such that they fuse together during lamination, such as by comprising the same material, and a strong bond therebetween is formed. The security element 11 and at least one core layer 12 may alternatively or additionally be fixed together by an adhesive, which may be provided along at least one surface of the security element 11 prior to its location in the at least one core layer 12.

The invention claimed is:

1. A core structure for forming a security sheet comprising:
at least one core layer comprising a plastic and first and second core surfaces and one or more perforations; and
a security element extending through the one or more perforations of the at least one core layer from the first core surface to the second core surface and comprising at least one first region overlying part of the first core surface and at least one second region overlying part of the second core surface,
wherein the one or more perforations define a tab and the security element extends through a respective one of the one or more perforations twice such that a second region of the security element overlies at least part of the second core surface of the tab and first regions of the security element overlie at least part of the first core surface adjacent the tab or between adjacent tabs, or vice-versa.

2. A core structure as claimed in claim 1 wherein the one or more perforations is preformed, cut, die cut and/or punched in the at least one core layer.

3. A core structure as claimed in claim 1 wherein at least part of the at least one core layer is opaque adjacent to at least one first and/or second region of the security element such that the at least one first region is not visible in reflected light incident upon the second core surface and/or the at least one second region is not visible in reflected light incident upon the first core surface.

4. A core structure as claimed in claim 1 wherein the security element extends through the at least one core layer at a plurality of locations and, between adjacent locations, comprises a first region overlying part of the first core surface or a second region overlying part of the second core surface.

5. A core structure as claimed in claim 1 wherein the security element comprises at least one layer of material selected for fusing with the at least one core layer during lamination.

6. A core structure as claimed in claim 1 comprising a plurality of security elements.

7. A stack for forming a security sheet comprising a core structure comprising:
at least one core layer comprising a plastic and first and second core surfaces and one or more perforations; and
a security element extending through the one or more perforations of the at least one core layer from the first core surface to the second core surface and comprising at least one first region overlying part of the first core surface and at least one second region overlying part of the second core surface,
wherein the one or more perforations define a tab and the security element extends through a respective one of the one or more perforations twice such that a second region of the security element overlies at least part of the second core surface of the tab and first regions of the security element overlie at least part of the first core surface adjacent the tab or between adjacent tabs, or vice-versa; and
at least one further layer overlying the first and/or second core surface.

8. A stack as claimed in claim 7 wherein the at least one further layer comprises at least one transparent region through which at least one first and/or second region of the security element is visible in reflected light incident upon the at least one transparent region.

9. A stack as claimed in claim 8 wherein the at least one further layer comprises at least one opaque region defining at least part of the perimeter of the at least one transparent region and which blocks at least one first and/or second region of the security element from view when viewed in reflected light incident upon the at least one opaque region.

10. A security sheet comprising a plastic substrate, the plastic substrate comprising the core structure of claim 1 or the stack of claim 7 laminated together.

11. A security document comprising the security sheet of claim 10 wherein the security document is a passport, driving licence, certificate, passbook, identification document, licence or cheque book.

\* \* \* \* \*